March 1, 1966  M. STAUNT  3,237,306
WATER COOLANT SUPPLY SYSTEM FOR AIR-DRIVEN DENTAL HANDPIECES
Filed Jan. 9, 1962  3 Sheets-Sheet 1

INVENTOR.
Martin Staunt.
BY Robert H. Wendt.
Attorney.

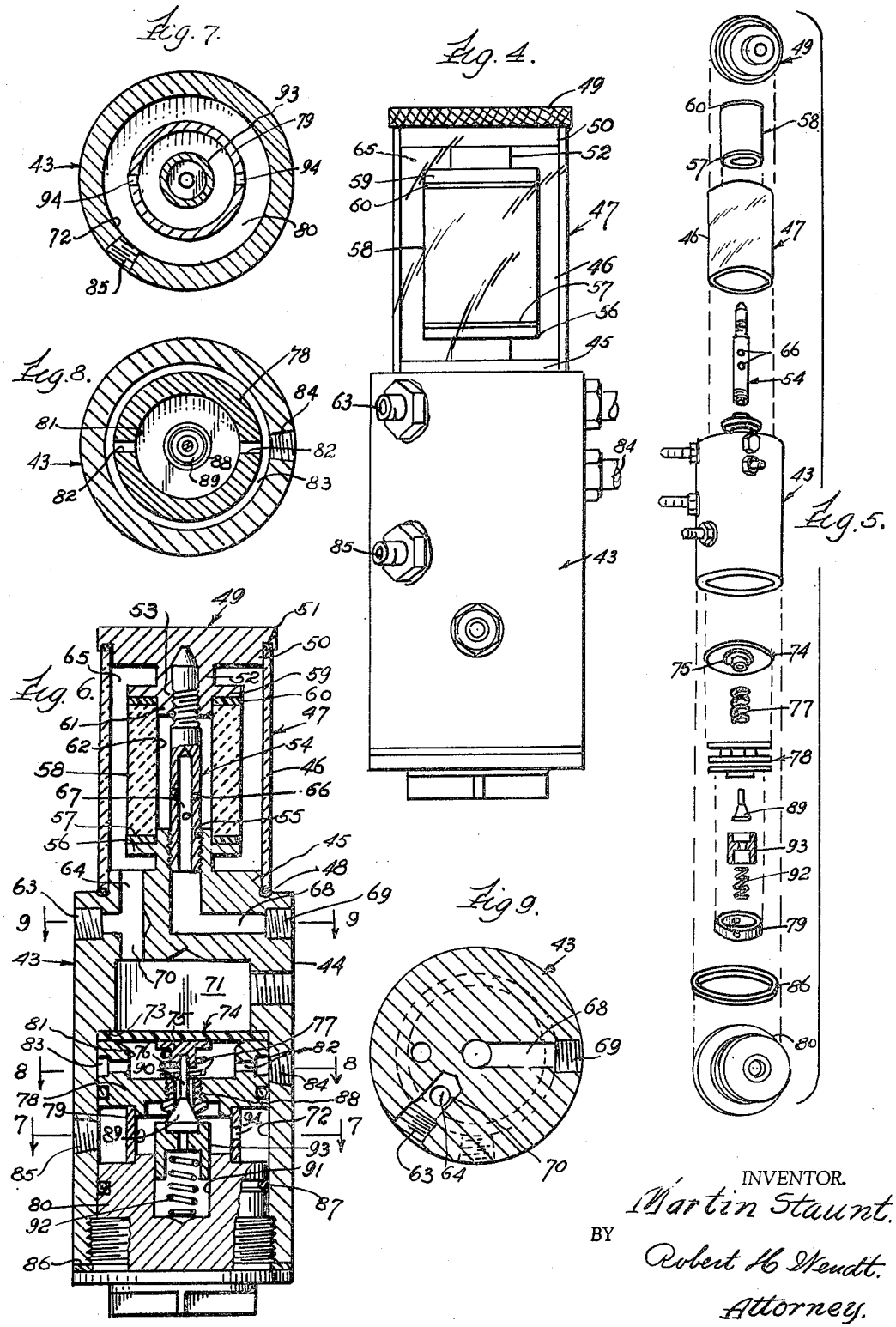

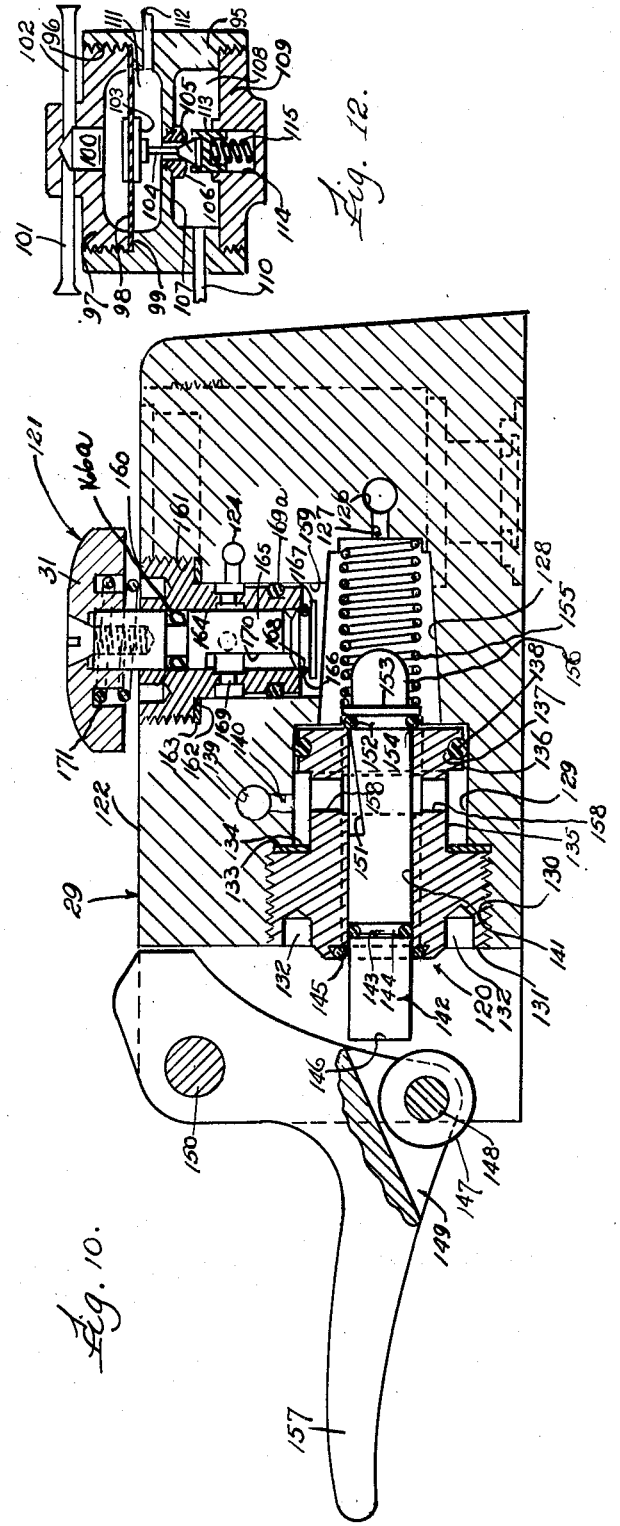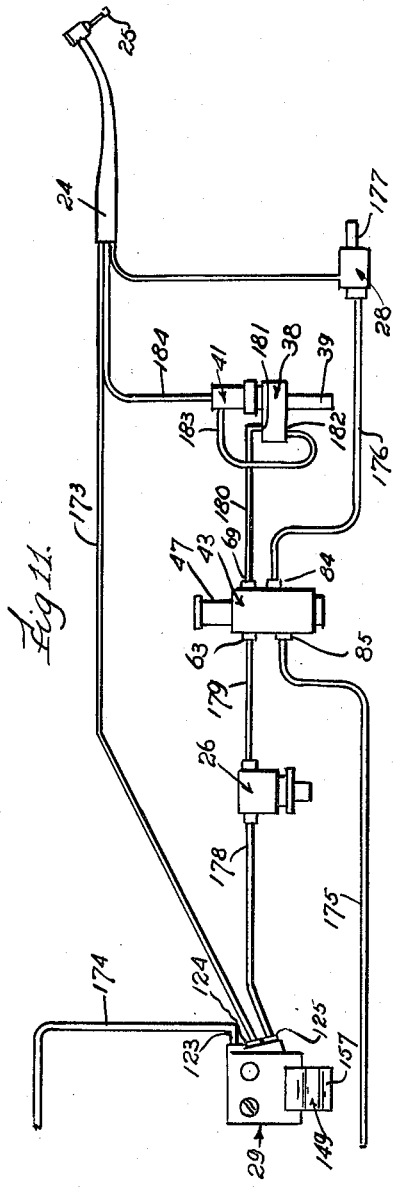

United States Patent Office 3,237,306
Patented Mar. 1, 1966

3,237,306
WATER COOLANT SUPPLY SYSTEM FOR AIR-DRIVEN DENTAL HANDPIECES
Martin Staunt, Des Plaines, Ill., assignor, by mesne assignments, to American Hospital Supply Corporation, Evanston, Ill., a corporation of Illinois
Filed Jan. 9, 1962, Ser. No. 165,118
1 Claim. (Cl. 32—28)

The present application is a continuation-in-part of my prior applications Serial No. 798,866, filed March 12, 1959, and Serial No. 21,293, filed April 11, 1960, now Patent No. 3,054,187.

The present invention relates to a water coolant supply system for air-driven dental handpieces and, more specifically, to a control system particularly suitable for use in operating rooms of hospitals or other environments where there might be a danger of explosion due to the presence of gases used in anesthesia.

One of the objects of the invention is the provision of an explosion-proof control system in which the water coolant spray at the dental handpiece is turned on automatically when the drive air is turned on and turned off automatically when the handpiece is stopped by turning off the drive air, so that whenever the dental bur is running it is provided with a water spray to cool the bur and the tooth.

Another object of the invention is the provision of an improved control for the water spray of a dental handpiece by means of which the drop of water may be eliminated which would otherwise remain at the orifice of the water nozzle, depositing calcium and other entrained or dissolved minerals upon the surfaces of the ball bearings.

Another object is the elimination of water drippage from the water nozzle of a dental handpiece by not only shutting off the water when the handpiece is stopped, but withdrawing into the nozzle and conduit any drops of water which may remain at the nozzle orifice.

Another object is the provision of an improved air controlled water valve which turns on the water spray at the nozzle of the dental handpiece when the air is turned on to drive the turbine and which turns off the water when the handpiece is stopped and also retracts into the nozzle and conduit connected to it any water which may remain at the nozzle orifice.

Another object of the invention is the provision of an improved control unit for air driven dental handpieces which has a minimum number of parts, which is simple in construction, and which includes components that do not require the use of electric switches.

Other objects and advantages of the invention will be apparent from the following description and the accompanying drawings, in which similar characters of reference indicate similar parts throughout the several views.

Referring to the drawings, of which there are three sheets,

FIG. 4 is a side elevational view of the combined filter and water retractor;

FIG. 5 is an exploded view of the parts of FIG. 4;

FIG. 6 is a sectional view taken on a plane passing through the axis of FIG. 4;

FIG. 7 is a sectional view taken on the plane of the line 7—7 of FIG. 6, looking in the direction of the arrows;

FIG. 8 is a sectional view taken on the plane of the line 8—8 of FIG. 6, looking in the direction of the arrows;

FIG. 9 is a sectional view taken on the plane of the line 9—9 of FIG. 6, looking in the direction of the arrows;

FIG. 10 is a fragmentary sectional view taken through a foot controller of the type employed in FIGS. 1 or 2;

FIG. 11 is a diagrammatic view of the components and conduits used in the system of FIGS. 1 or 2.

FIG. 12 is a modification of the control valve shown in FIG. 6.

Figure 1:
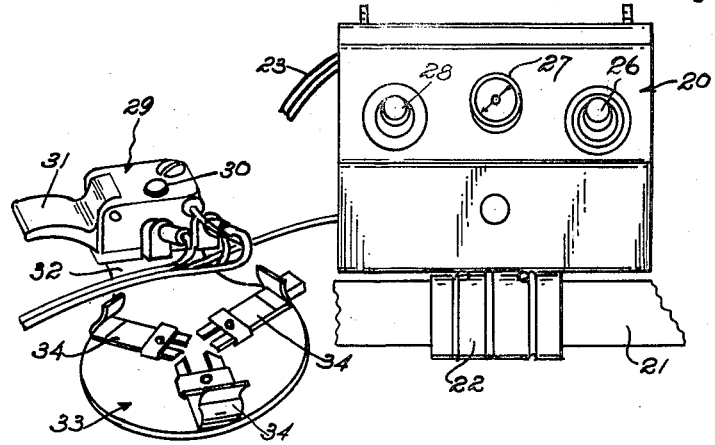
FIG. 1 is a view in perspective of the control unit adapted to be mounted on an arm of the dental column and having a foot controlled air valve which may be attached to the usual electrical controller or gear driven dental handpieces.

Referring to FIG. 1, this is a fragmentary view in perspective showing a control cabinet 20 of the type employed in the system of FIG. 11 and the cabinet 20 may be clamped on the arm 21 by means of a clamp 22 and provides the drive air, cooling air, chip air, and water supply for the dental handpiece through a plurality of flexible conduits 23 extending to the air driven dental handpiece 24 which drives the dental bur 25.

The present cabinet is provided with the air pressure gauge 27 and the spray control needle valve 28.

While the drive air for the handpiece 24 may be turned on or off at the cabinet 20, the system is preferably provided with a foot controller 29 of the type shown in FIG. 10 having a foot controlled plunger 30 for turning on and off the chip air and having a foot lever 31 for turning the drive air on or off and regulating the pressure and volume of the drive air to control the speed of the handpiece 24.

The foot controller 29 is fixedly secured to a laterally extending portion 32 of a base plate 33, which may be clamped to the bottom of the usual electric engine controller for belt driven handpieces by means of the radially adjustable clamps 34.

Figure 2:
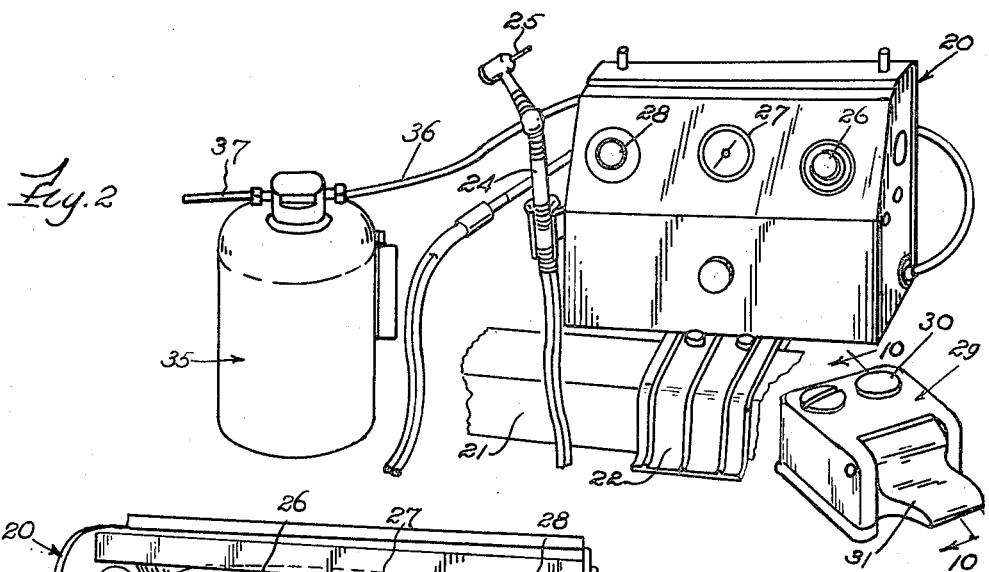
FIG. 2 is a similar view of a modification provided with a water flask for water supply and a separate air foot controller.

Referring to FIG. 2, this is a modification in which the water supply is provided by a water flask 35 having a flexible water conduit 36 extending to the control unit 20 and provided with a connection 37 for air under pressure to force the water into a depending tube which is an extension of the conduit 36.

Figure 3:
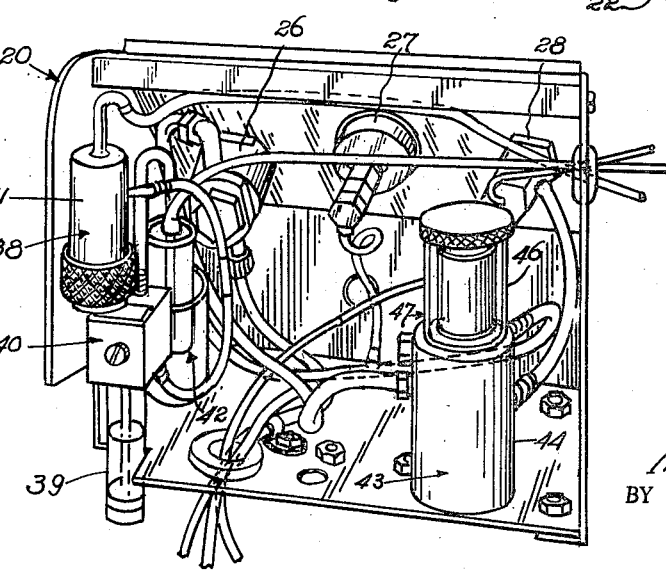
FIG. 3 is a similar view showing the rear side of the cabinet and the components mounted therein.

Referring to FIG. 3, this is a rear view in perspective showing the various components of the present system mounted in the cabinet, which is provided with the air pressure regulator 26, the pressure gauge 27, and the spray control needle valve 28.

The system includes the lubricator 38 of the type covered by my prior patent, No. 2,943,705, issued July 5, 1960, on Lubricating Apparatus, having a reservoir 39 for edible lubricant, a body 40, and a liquid lubricant separator 41.

The cabinet also supports the liquid lubricant separator 42 for separating lubricant from the exhaust drive air and the combined air filter and air controlled water valve 43, further to be described.

These components are connected together in the manner shown in FIG. 11.

Referring to FIG. 4, the combined air filter and air controlled water valve 43 is shown in elevation and in FIG. 6 in section along an axial plane.

This unit preferably has a cylindrical metal body 44 provided with an upper reduced cylindical portion 45 for supporting the transparent plastic cylinder 46 forming part of the housing of the air filter 47.

The air filter 47 has its cylindrical housing 46 engaging an O ring 48 at the bottom to effect an air seal and is closed at the top by a metal cap 49 having a reduced portion 50 for receiving the transparent cylinder 46; and the cap 49 is also provided with a resilient gasket 51 engaging the end of cylinder 46.

The cap 49 is supported by means of an inner body 52 having a threaded bore 53 for receiving the threaded end of a tubular rod 54 which has its lower end in a threaded bore 55 in the body 43.

The extension 45 supports a cylindrical plate 56 surrounding the tube 54 and provided with a rubber gasket 57 for seating the air filter element 58 comprising a solid porous body for removing the solids and water from the air passing through it.

The upper plug 49 also supports a disc 59 engaging a gasket 60 and having a cylindrical extension 61 engaging inside the bore 62 of the filter element.

The body 43 has its air inlet at 63 which communicates with an upper port 64 leading to the space 65 surrounding the filter element; and the air passes through the filter element to the inner bore 62 which communicates with a plurality of apertures 66 in the tubular member 54 to the inner bore 67.

The air passes down the bore 67 in the filter stem to the conduit 68 which extends to the air filter outlet 69 which is connected to suitable conduits, as shown in FIG. 11, to conduct the air to the lubricator.

The air inlet 63 also communicates with a downwardly extending conduit 70 which extends to a cylindrical air chamber 71 that is also subjected to air pressure when the air is turned on. The chamber 71 communicates with a larger counterbore 72 having an annular seat 73 against which a flexible rubber diaphragm 74 is seated.

The diaphragm 74 has a hub 75 secured to it and provided with a cylindrical body 76 for supporting a diaphragm spring 77 opposing the air pressure.

The counterbore 72 is adapted to receive the cylindrical partition 78 which is pressed against the diaphragm by a tubular spacer 79 which is engaged by the end of screw plug 80, clamping the diaphragm against the annular shoulder 73.

The partition 78 has a cylindrical bore 81 forming a water chamber, the walls of which are provided with passages 82 leading to an annular groove 83 which communicates with the water outlet 84.

The body 43 has a water inlet 85; and the lower end of the bore 72 is closed by the screw plug 80, having a gasket 86 and an O ring 87.

The partition 78 has a valve seat 88 threaded therein and adapted to be closed by a conical rubber valve 89 having a stem 90 engaging in a bore in the diaphragm hub 76. The plug 80 has a cylindrical bore 91 containing a compression spring 92 engaging a cylindrical valve guide 93 which engages the head of the valve 89, urging the valve into closed position.

The spacer 79 has a plurality of apertures 94 permitting the water to pass from the inlet 85 through the valve seat 88 to the outlet 84 when the valve is open.

When the air pressure is turned off, the valve is automatically closed, shutting off the water by the action of the spring 92; but the diaphragm 74 is adapted to move beyond its central position when the air pressure is shut off in the chamber 71, so that the diaphragm 74 not only permits the valve 89 to close, shutting off the water, but the movement of the diaphragm draws back water into the outlet 84 and draws water back into the conduits connecting with the outlet 84.

Referring to FIG. 12, this is a modification in which a metal body 95 is provided with a threaded bore 96 for receiving the threaded plug 97 which clamps the diaphragm 98 against an annular seat 99. The threaded plug 97 has a conduit 100 communicating with the drive air inlet 101 and outlet 102 so that the diaphragm is subjected to air pressure when the drive air is turned on.

The diaphragm 98 supports a hub 103 having a bore for receiving the valve stem 104 supporting a rubber conical valve 105 which engages a valve seat 106. The valve seat 106 is mounted in partition 107, forming a water chamber 108 which is closed by threaded screw plug 109.

The chamber 108 has a water inlet tube 110; and chamber 111 has a water outlet tube 112.

Valve 105 is engaged in a bore in the valve guide 113, which slides in the bore 114 in the plug 109, and is provided with valve spring 115.

The operation of this water control valve is substantially the same as that shown in FIGS. 4–9, although it is simpler in construction.

Air inlet 101 is connected by a flexible tube to the air line extending from the lubricator 108 and in the air outlet 102 is connected to the air driven dental handpiece. Diaphragm 98 is subjected to air pressure when the drive air is turned on.

Water inlet 110 is connected to the source of water under pressure and the water outlet 112 is connected by flexible tubes to the handpiece water nozzle. The valve 105 not only shuts off the flow of water at the nozzle when the drive air is turned off, but the diaphragm 98 is adapted to suck back into the conduit 112 and into the water nozzle of the handpiece any drops which may remain at the nozzle orifice.

Referring to FIG. 10, this is a fragmentary sectional view taken through the foot controller 29 of FIG. 2 on the plane of the line 10—10, looking in the direction of the arrows. This foot controller is similar to that shown in my prior application, Ser. No. 21,293, now Patent No. 3,054,187 except that the electrical switch has been eliminated, thereby eliminating all possibility of any electrical sparks, which might cause explosion.

This foot controller includes two valve assemblies, the first of which, indicated at 120, is the drive air valve assembly; and the second, indicated at 121, is the chip air valve assembly. These two valve assemblies are mounted in a single metal body 122, which is provided with an inlet 123 for receiving air under pressure and with two outlets 124 for chip air and 125 for drive air.

The air inlet 123 communicates with the conduit 126 (FIG. 10) which extends through conduit 127 to the bore 128. The bore 128 communicates with a larger cylindrical counterbore 129 which communicates with a threaded bore 130 for receiving a threaded valve plug 131.

The threaded valve plug 131 has sockets 132 for a wrench and has an annular shoulder 133 engaging a gasket 134 to provide an air-tight seal at this end of the bore 129. The threaded plug 131 has a rectangular groove 135 extending about its reduced end 136 which is provided with a groove 137 for an O ring 138. The O ring 138 provides an air-tight seal at the right end of bore 129.

The bore 129 and groove 135 communicate with an outlet conduit 139 by means of conduit 140. Outlet conduit 139 extends to the drive air outlet 125 of the foot controller, FIG. 11.

The threaded plug 131 has an axial cylindrical bore 141 which slidably supports a valve plunger 142 of generally cylindrical shape. Valve plunger 142 has a circular groove 143 for receiving an O ring 144 engaging the walls of bore 141 and effecting a seal. Plug 131 may also support an O ring 145 engaging the outside of plunger 142.

The plane end 146 of plunger 142 is adapted to be engaged by roller 147 pivotally mounted by pin 148 upon a bellcrank foot lever 31, which is pivoted by means of pin 150 on the body 29. The plunger 142 is provided with a flat tapered groove 151 which is closed at its right end in FIG. 10, where the plunger is provided with an O ring 152 and an annular flange 153.

The O ring engages the valve opening 154 at the right end of bore 141 and the flange 153 is engaged by spring 155, which is seated about a cylindrical lug 156 and engages the end of bore 128. Spring 155 urges plunger 142 toward the left, closing the valve opening 154 at the O ring 152.

When the operator steps upon the projecting horizontal end 157 of bellcrank 31, roller 147 engages plunger 142, moving it inward to open the drive air valve at 154.

This opening gradually increases in area at the flat groove 151, permitting air to pass from bore 141 through radial conduits 158 to the annular groove 135, conduit 140, to conduit 139 which communicates with the foot controller outlet 125. Thus the foot lever bellcrank 31 is adapted to turn on the drive air and to regulate its volume and pressure, thus controlling the speed of the air driven handpiece.

The bore 128 also communicates with a vertical bore 159, which contains the chip air valve assembly 121. This valve assembly is mounted in a threaded plug 160, which is threaded into a threaded bore 161. The plug 160 has an annular shoulder 162 engaging a gasket 163, effecting an air seal at the top of bore 159. Threaded plug 160 has an axial cylindrical bore 164 for receiving a cylindrical plunger 165.

This plunger has a groove for an O ring 166a near its upper end and a circular disc 167 at its lower end with a groove for supporting an O ring 168. There is an O ring 169a near the lower end of threaded plug 160; and plunger 165 has a flat portion 170 permitting air which passes the O ring 168 to pass through radial bores 169 to an annular groove 170, which communicates with outlet conduit 124.

Plunger 165 is urged upward by a spring 171, which engages under a foot button 31 that is secured to the upper end of the plunger.

When the operator steps on the foot button 31, chip air is permitted to pass out of the chip air outlet 124 to the air driven dental handpiece 24, which has a chip air nozzle directing air toward the dental bur 25.

The conduits of the present control system are illustrated in FIG. 11.

173 indicates a flexible plastic conduit extending from the chip air outlet 124 of the foot controller 29 to the chip air nozzle of the handpiece 24. 174 indicates a flexible conduit extending from the control cabinet 20 to the foot controller for providing air under pressure entering the foot controller at 123. 175 indicates a conduit connected to a source of water under pressure; and it extends to the water inlet 85 of the combined air filter and air controlled water valve 43.

The water outlet 84 of this unit is connected by conduit 176 to the spray control needle valve 28 having a manually actuated stem 177 for regulating the amount of water available for spray at the dental handpiece 24, which has the usual water spray nozzle spraying water on the bur 25.

The air driven dental handpiece may be of the type disclosed in my prior application, Ser. No. 789,751, filed January 28, 1959, now Patent No. 3,084,439 for Air Driven Dental Handpieces, the disclosure of which is hereby incorporated herein by reference thereto.

The outlet 125 for drive air from the foot controller 29 is connected by conduit 178 to the air pressure regulator 26. This air pressure regulator is of the type disclosed in my prior appliation, Ser. No. 798,866, filed March 12, 1959, for Control Unit for Air Driven Dental Handpieces, the disclosure of which is hereby incorporated herein by reference thereto.

The pressure regulator 26 permits the manual adjustment of its air pressure output by rotating the knob 26.

The outlet of the air pressure regulator 26 is connected by conduit 179 to the air inlet 63 of the combined air filter and air pressure responsive water valve 43. The air is filtered through the filter unit 47; and the air outlet 69 of this unit is connected by conduit 180 to the inlet 181 of the lubricator 38.

The lubricator 38 applies air pressure to lubricant in the reservoir 39, as described in my prior patent; and the air coming from outlet 182 contains edible lubricant in the form of a mist. The air and lubricant mist pass through conduit 183 to the separator 141, where any liquid lubricant is separated and drive air with lubricant mist passes out of the conduit 184 to the drive air inlet of handpiece 24.

Thus the operator may start the handpiece by stepping on the foot pedal 149 by means of which he may also regulate its speed and stopping by lifting his foot.

When drive air is applied to the air driven handpiece 24, air pressure is applied to the water valve 43, automatically turning on the water spray for cooling the bur 25; and the water spray is automatically turned off when the drive air pressure is turned off at the foot controller 29.

As distinguished from the control systems of the prior art, there are no electric switches or solenoid valves in this system; and therefore there is no possibility of sparks which might cause explosion.

While I have illustrated a preferred embodiment of my invention, many modifications may be made without departing from the spirit of the invention, and I do not wish to be limited to the precise details of construction set forth, but desired to avail myself of all changes within the scope of the appended claim.

Having thus described my invention, what I claim as new and desire to secure by Letters Patent of the United States, is:

A water coolant supply system for an air-driven dental handpiece comprising a water conduit adapted to be connected to a source of water coolant under pressure; a water spray nozzle connected to and communicating with said water conduit and adapted to be positioned adjacent a bur driven by a dental handpiece to direct cooling water towards the cutting end of the bur; an air conduit adapted to extend from a source of drive air to an air-driven dental handpiece for supplying drive air to the handpiece; and a water retractor interposed along said air conduit and said water conduit and having an air chamber communicating with said air conduit and a water chamber communicating with said water conduit, respectively; said retractor including air pressure responsive means in the form of a flexible diaphragm separating said air and water chambers; a water control valve disposed in said water chamber comprising a partition dividing said water chamber into two sections; a valve passage extending through said partition and interconnecting said sections, and a movable valve member for closing and opening said passage; means extending between said diaphragm and said valve member for holding said valve member in open position when said diaphragm is flexed in one direction by air pressure in said air chamber; means urging said valve member into a closed position when said air pressure in said air chamber is reduced and said diaphragm is substantially unflexed; and means for flexing said diaphragm in a direction opposite to said one direction after said valve is closed, thereby increasing the volume of one section of said water chamber; said one section of said water chamber communicating through said water conduit with said water spray nozzle, and the other section of said water chamber communicating with that portion of the water conduit adapted to extend from a source of water under pressure; whereby, when drive air pressure is turned off, said valve closes and said diaphragm flexes in said opposite direction to retract water from said nozzle into said water conduit.

References Cited by the Examiner
UNITED STATES PATENTS

| | | | |
|---|---|---|---|
| 2,309,296 | 1/1943 | Bentley | 137—87 |
| 2,855,672 | 10/1958 | Franwick et al. | 32—28 |
| 2,882,861 | 4/1959 | Hillman | 173—77 |
| 2,960,060 | 11/1960 | Chatterton | 141—117 X |
| 3,067,765 | 12/1962 | Aymar et al. | 32—28 X |
| 3,129,511 | 4/1964 | Williams | 32—28 |

ISADOR WEIL, *Primary Examiner.*

JORDAN FRANKLIN, WILLIAM F. O'DEA,
*Examiners.*